United States Patent [19]

Palmer

[11] Patent Number: 5,176,304
[45] Date of Patent: Jan. 5, 1993

[54] CLOTHING BAR APPARATUS

[76] Inventor: Barbara A. Palmer, 2307 N. 80 St. #3, Wauwatosa, Wis. 53213

[21] Appl. No.: 802,480

[22] Filed: Dec. 5, 1991

[51] Int. Cl.[5] .............................................. B60R 7/10
[52] U.S. Cl. ........................... 224/313; 224/42.45 A; 224/42.46 A; 211/123; 211/124; 296/37.1; 296/37.8
[58] Field of Search ......... 224/313, 42.45 A, 42.46 A; 211/105.1, 123, 124; 296/37.1, 37.8

[56] References Cited

U.S. PATENT DOCUMENTS

| | | | |
|---|---|---|---|
| 2,517,072 | 8/1950 | Zimmer | 224/313 X |
| 3,481,483 | 12/1969 | Harvey et al. | 224/313 X |
| 3,596,815 | 8/1971 | Willett | 224/313 |
| 4,720,028 | 1/1988 | Takemura et al. | 224/313 X |
| 4,778,089 | 10/1988 | White et al. | 224/313 X |

Primary Examiner—Allan N. Shoap
Assistant Examiner—Paul A. Schwarz
Attorney, Agent, or Firm—Hugh E. Smith

[57] ABSTRACT

A housing member is mounted within a roof portion of an associated automobile to include an elongate clothing support rod longitudinally and medially mounted within the housing member. Access to the clothing rod is effected through slide plates mounted through a bottom wall of the housing member providing for an unobtrusive clothing support bar structure within the associated vehicle. A modification of the invention includes a pneumatic bladder mounted about the clothing rod and inflation apparatus arranged for selective inflation and deflation of the bladder to enhance engagement of hanger members mounted about the support rod.

7 Claims, 5 Drawing Sheets

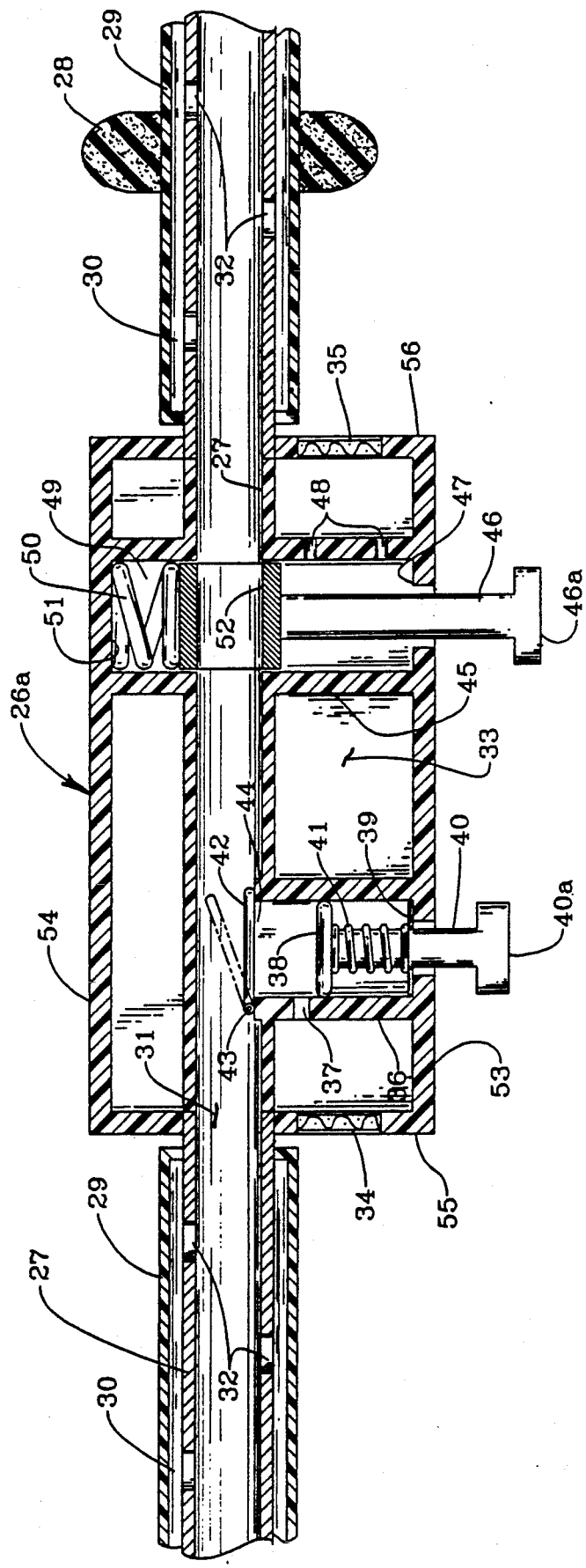

CLOTHING BAR APPARATUS

BACKGROUND OF THE INVENTION

1. Field of the Invention

The field of invention relates to clothing support apparatus, and more particularly pertains to a new and improved clothing bar apparatus wherein the same is mounted within a vehicle within the roof portion of the vehicle for avoiding intrusion into the associated passenger compartment portion of the vehicle.

2. Description of the Prior Art

Various clothing and garment support structure has been utilized in the prior art for the positioning and mounting of garments within an associated vehicle. Such structure is typically positioned interiorly of the vehicle effecting adversely interior compartment room. Such apparatus is exemplified in the U.S. Pat. No. 4,778,089 to White, et al. wherein a clothes hanger member is mounted between side walls of the associated vehicle, such as a passenger compartment.

U.S. Pat. No. 4,936,491 to Calad sets forth a retractable hanger including arms that is retractable within the associated vehicle body.

U.S. Pat. No. 3,596,815 to Willett sets forth a clothing rack for vehicles positioned in adjacency to an interior surface of the associated vehicle roof.

As such, it may be appreciated that there continues to be a need for a new and improved clothing bar apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of clothing support apparatus now present in the prior art, the present invention provides a clothing bar apparatus wherein the same is arranged to provide a housing positioned within spaced roof panels of an associated vehicle, with a plurality of doors to limit access to a support rod within the housing member for utilization of selective portions of the support rod for the support and mounting of clothing. As such, the general purpose of the present invention, which will be described subsequently in greater detail, is to provide a new and improved clothing bar apparatus which has all the advantages of the prior art clothing support apparatus and none of the disadvantages.

To attain this, the present invention provides a housing member mounted within a roof portion of an associated automobile to include an elongate clothing support rod longitudinally and medially mounted within the housing member. Access to the clothing rod is effected through slide plates mounted through a bottom wall of the housing member providing for an unobtrusive clothing support bar structure within the associated vehicle. A modification of the invention includes a pneumatic bladder mounted about the clothing rod and inflation apparatus arranged for selective inflation and deflation of the bladder to enhance engagement of hanger members mounted about the support rod.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved clothing bar apparatus which has all the advantages of the prior art clothing support apparatus and none of the disadvantages.

It is another object of the present invention to provide a new and improved clothing bar apparatus which may be easily and efficiently manufactured and marketed.

It is a further object of the present invention to provide a new and improved clothing bar apparatus which is of a durable and reliable construction.

An even further object of the present invention is to provide a new and improved clothing bar apparatus which is susceptible of a low cost of manufacture with regard to both materials and labor, and which accordingly is then susceptible of low prices of sale to the consuming public, thereby making such clothing bar apparatus economically available to the buying public.

Still yet another object of the present invention is to provide a new and improved clothing bar apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is an orthographic view, taken along the lines 7—7 of FIG. 6 in the direction indicated by the arrows.

DESCRIPTION OF THE PREFERRED EMBODIMENT

Figure 1:
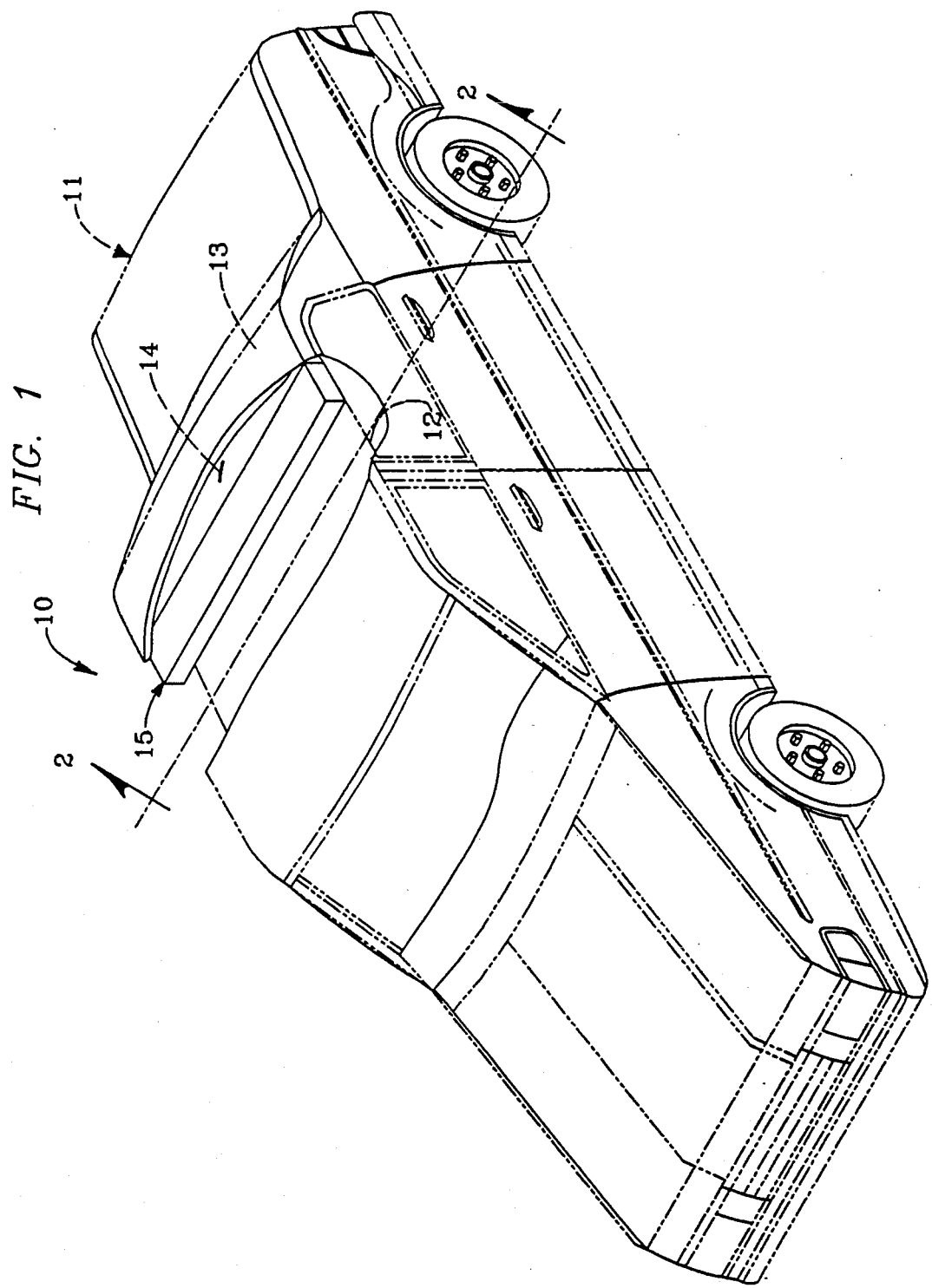
FIG. 1 is an isometric illustration of the instant invention in use.
Figure 2:
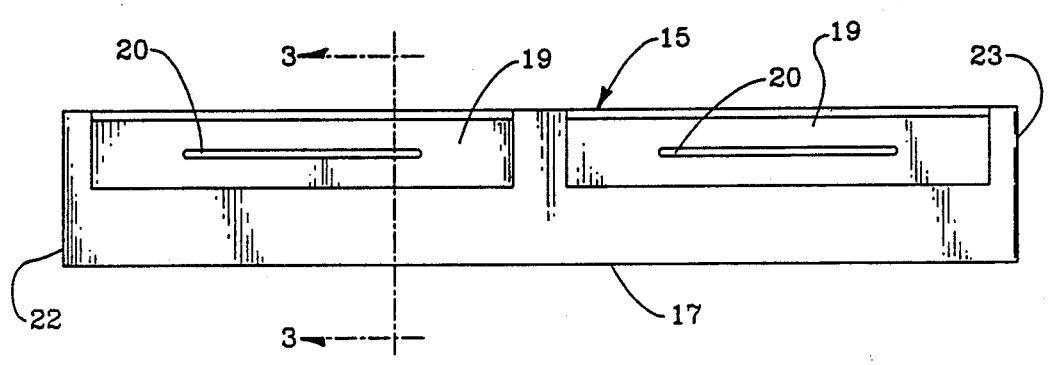
FIG. 2 is an orthographic view, taken along the lines 2—2 of FIG. 1 in the direction indicated by the arrows.
Figure 3:
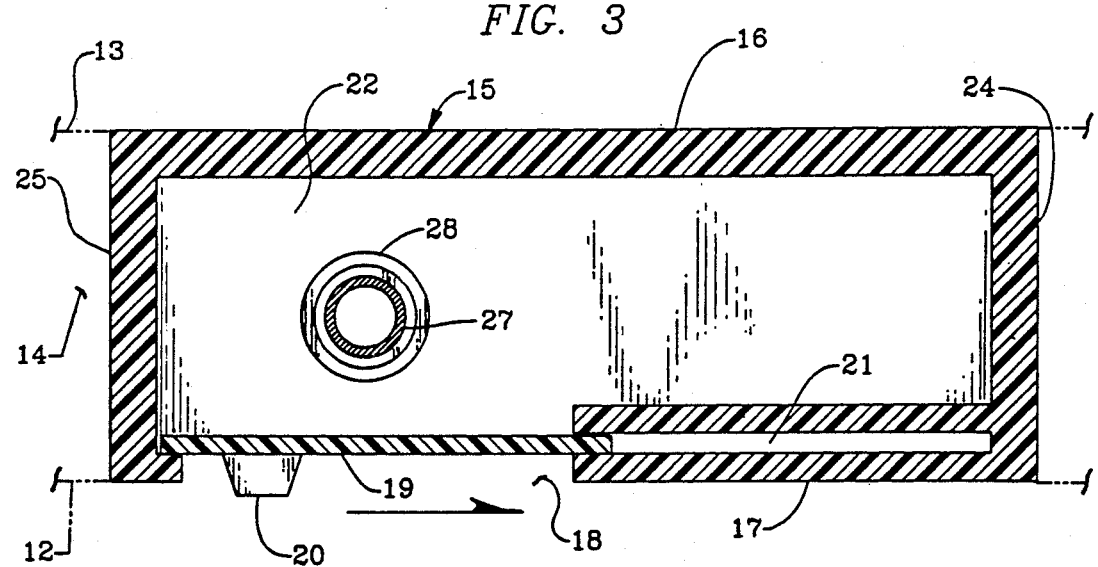
FIG. 3 is an orthographic view, taken along the lines 3—3 of FIG. 2 in the direction indicated by the arrows.
Figure 4:
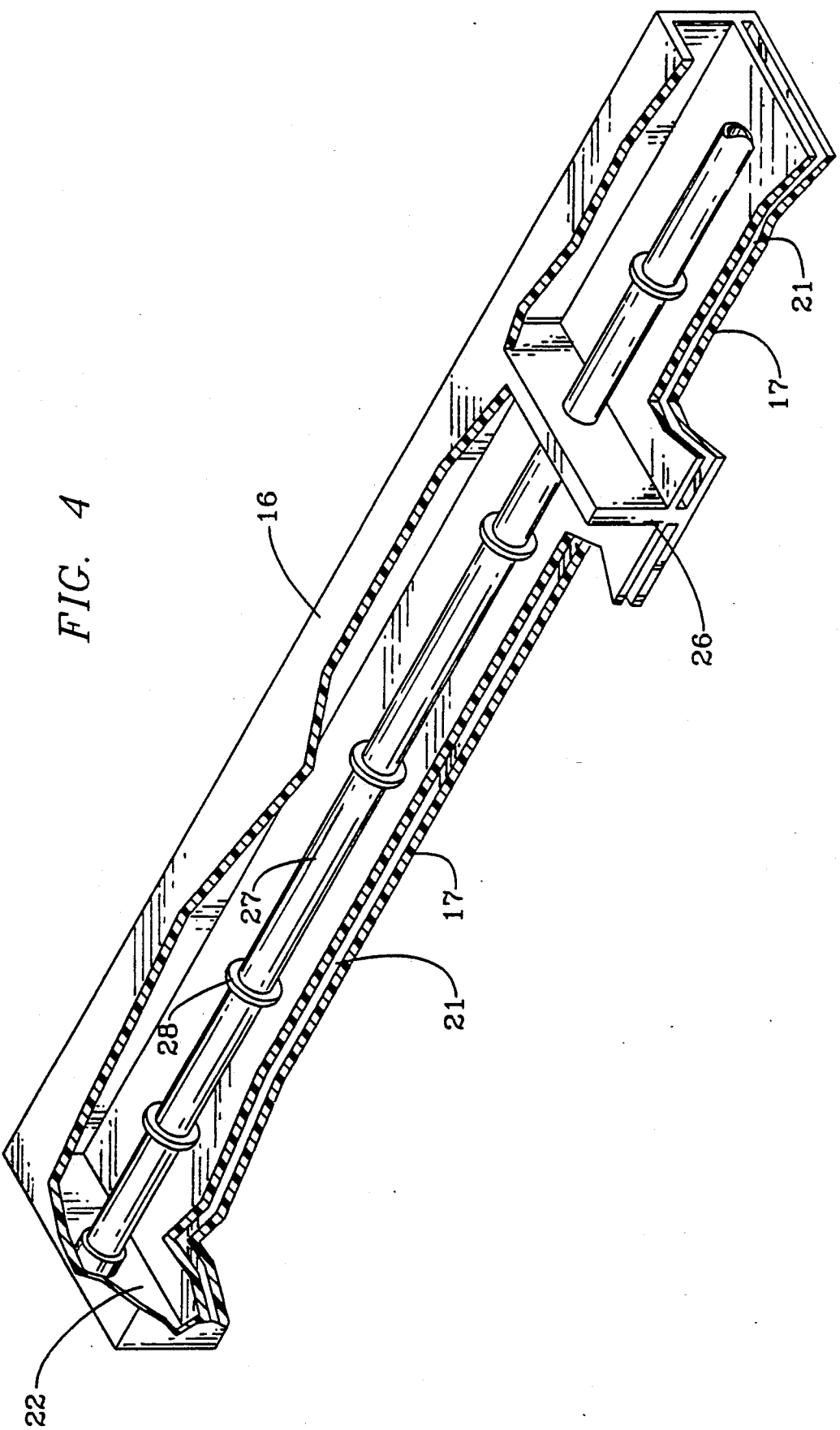
FIG. 4 is an isometric illustration, partially in section, of the instant invention.

With reference now to the drawings, and in particular to FIGS. 1 to 7 thereof, a new and improved clothing bar apparatus embodying the principles and concepts of the present invention and generally designated by the reference numerals 10 and 10a will be described.

More specifically, the clothing bar apparatus 10 of the instant invention essentially comprises the organization in association with a vehicle 11 that includes a lower roof panel 12 spaced from an upper roof panel 13 defining a roof cavity 14 therebetween. A housing member 15 is mounted within the roof cavity 14, with the housing member including a bottom wall 17 aligned with the lower roof panel 12 and a top wall 16 aligned, or alternatively, positioned adjacent the upper roof panel 13. The bottom wall 17 includes a plurality of bottom wall openings 18, each including a slide plate 19 slidably mounted within the openings 18, with the slide plates 19 including a slide plate handle 20 and received within a bottom wall slot 21 that is positioned rearwardly and adjacent each opening 18 (see FIG. 3). The slots 21 are parallel relative to the bottom wall 17 to permit displacement of an associated slide plate 19 relative to the respective opening 18 permitting access to a support rod 27 that is orthogonally and fixedly mounted between a housing first end wall 22 and a housing second end wall 23 and parallel relative to the bottom wall 17. A housing front wall 25 and a housing rear wall 24 define the housing member 15. A partition wall 26 arranged parallel between the end walls 22 and 23 is positioned between the slide plates 19 to permit limited access interiorly of the housing to thereby permit limiting of the support rod 27 used to a portion of an interior compartment of the vehicle, wherein clothing hangers (not shown) are mounted about the support rod 27 through the bottom wall opening 18 relative to each slide plate 19. Divider rings 28 may be provided and slidably positioned along the support rod 27 to divide and maintain clothing in particular orientations and more specifically the hangers along discrete portions of the support rod 27.

Figure 5:
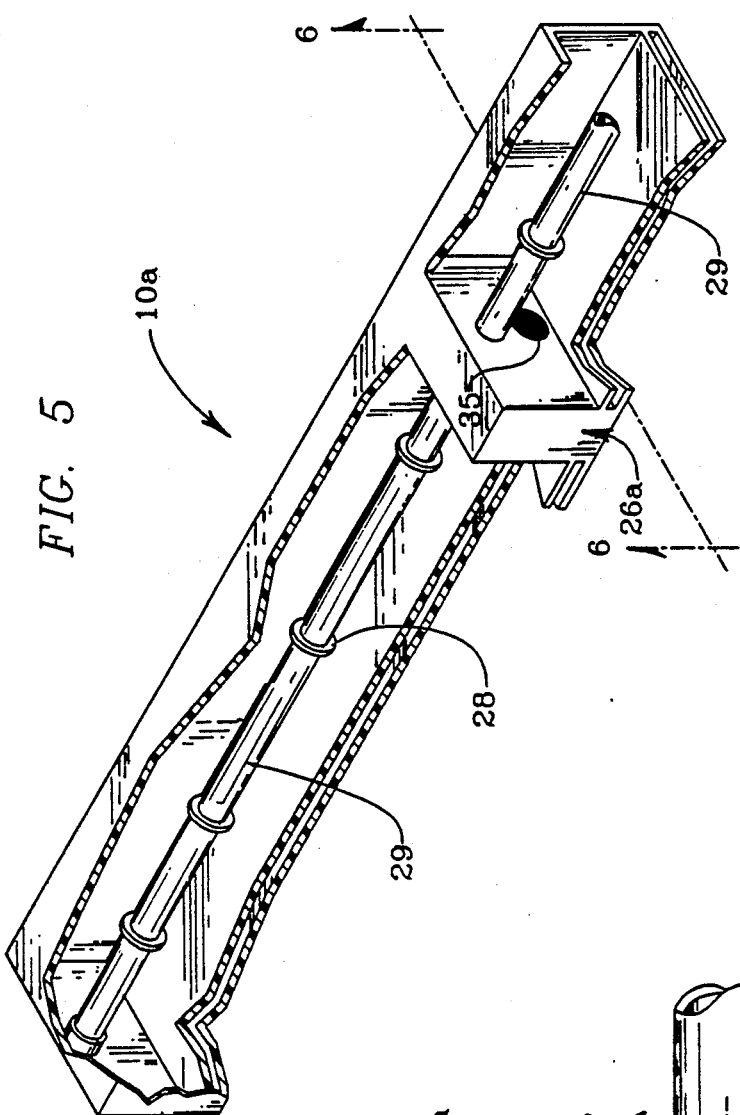
FIG. 5 is an isometric illustration of a modification of the invention.
Figure 6:
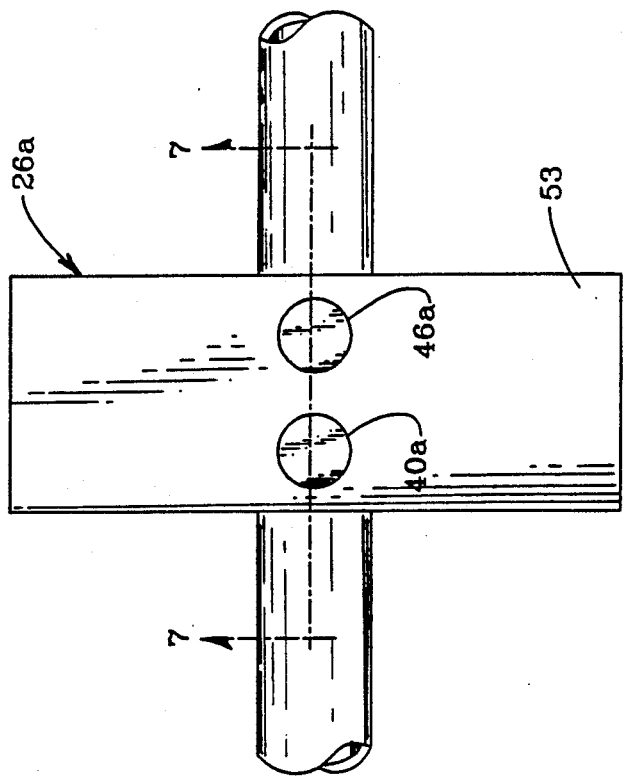
FIG. 6 is an orthographic view, taken along the lines 6—6 of FIG. 5 in the direction indicated by the arrows.

The FIGS. 5-7 illustrate a modified apparatus 10a, wherein the partition wall 26 is constructed as a partition housing 26a, with the support rod 27 directed therethrough (see FIG. 7). Further, a cylindrical inflatable bladder 29 is mounted in surrounding relationship about the support rod, with an individual inflatable bladder 29 in surrounding relationship relative to the support rod above each opening 18. The support rod 27 is formed with a support rod central conduit 31, with the support rod including support rod apertures 32 directed through the support rod wall, wherein a pneumatic chamber 30 defined between the bladder 29 and the support rod 27 permits pneumatic communication between the support rod central conduit 31 and the pneumatic chamber 30, in a manner as illustrated in FIG. 7.

The partition housing 26a includes a partition housing chamber 33 defined therewithin between a partition housing bottom wall 53 and a partition housing top wall 54, a partition first side wall 55 and a partition housing second side wall 56, as the first and second partition housing side walls 55 and 56 receive the support rod 27 therethrough, as illustrated in FIG. 7. The partition housing includes a screened intake port 34 directed through the first side wall 55 and a screened exhaust port 35 directed through the second side wall 56. A pressure cylinder 36 is mounted within the partition housing chamber 33 fixedly mounted to the bottom wall 53, including a pressure cylinder piston 38 slidably mounted therewithin, where the pressure cylinder piston 38 is normally biased to a lowered first position below the pressure cylinder intake port 37 within the pressure cylinder 36 that is in pneumatic communication with the screened intake port 34. The pressure cylinder spring 41 is captured between a pressure cylinder floor 39 and a bottom surface of the pressure cylinder piston 38. The pressure cylinder piston 38 is orthogonally and fixedly mounted to an upper distal end of a pressure cylinder plunger rod 40 positioned medially of the spring 41 and terminating in a pressure cylinder plunger rod 40a below the partition housing bottom wall 53. A valve plate 42 normally biased in a closed configuration over the pressure cylinder exhaust opening 44 at an upper distal end of the pressure cylinder is displaced about the valve plate spring hinge 43 to permit projection of pressurized air into the support rod central conduit 31 for direction into the pneumatic chamber 30 of each bladder 29. A lower exhaust cylinder 45 coaxially aligned with an upper exhaust cylinder 49 diametrically positioned on opposed sides of the support rod 27 includes a lower exhaust cylinder rod 46 coaxially aligned within the lower exhaust cylinder 45 that projects through the partition housing bottom wall 53 terminating in an exhaust cylinder rod head 46a. At least one or a plurality of exhaust cylinder exhaust ports 48 directed through the exhaust cylinder and in pneumatic communication through the exhaust port 35 is operative upon displacement of a directional tube 52 that is normally biased in a coaxially aligned relationship relative to the support rod 27. An upper exhaust cylinder spring 50 mounted within the upper exhaust cylinder between the upper exhaust cylinder roof 51 and the directional tube 52 effects the coaxial alignment of the directional tube 52 relative to the support rod, and more specifically positioned between a gap support rod as illustrated in FIG. 7. Upon projection of the directional tube 52 into the upper exhaust cylinder 49, pneumatic pressure from the pneumatic chambers 30 is thereafter directed through the exhaust exit ports 48 and the exhaust port 35. Inflation of the bladders 29 permits enhanced securement minimizing sliding and displacement of hangers mounted upon the support rod 27 in use.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A clothing bar apparatus arranged for positioning within a vehicle, wherein the vehicle includes a lower roof panel spaced from an upper roof panel, and the apparatus comprises,
   a housing member, the housing member including a housing member bottom wall positioned in alignment with the lower roof panel, and
   the housing member including a housing top wall spaced from the housing bottom wall, and
   a housing rear wall spaced from a housing front wall, and
   a housing first end wall spaced from a housing second end wall, and
   a support rod fixedly mounted to the housing first end wall and the housing second end wall positioned in a spaced relationship relative to the housing rear wall and the housing front wall and the housing top wall and the housing bottom wall, and
   a partition housing directed substantially medially between the housing first end wall and the housing second end wall, with the support rod directed therethrough, and
   the housing bottom wall including a plurality of housing bottom wall openings, with the partition housing positioned between the bottom wall openings, and
   a bottom wall slot positioned adjacent each bottom wall opening rearwardly of each bottom wall opening extending from each bottom wall opening to the housing rear wall, and
   a slide plate mounted within each bottom wall slot arranged for projection from the slot to the housing front wall and permitting reception of each respective slide plate within a respective bottom wall slot for access to the support rod.

2. An apparatus as set forth in claim 1 wherein the support rod includes an inflatable bladder mounted about the support rod exteriorly of the support housing, and the support rod includes a support rod central conduit, and a pneumatic chamber oriented between the inflatable bladder and the support rod, and a plurality of support rod apertures directed through the support rod for pneumatic communication of the pneumatic chamber with the support rod central conduit, and the support rod in pneumatic communication with inflation means within the partition housing for effecting selective inflation and deflation of the pneumatic chamber.

3. An apparatus as set forth in claim 2 wherein the pneumatic housing includes a pressure cylinder in communication with the support rod central conduit, the pressure cylinder including a pressure cylinder piston slidably mounted within the pressure cylinder, and a pressure cylinder intake port directed through the pressure cylinder for directing air charge into the pressure cylinder above the pressure cylinder piston, and the pressure cylinder including a pressure cylinder floor, and a pressure cylinder spring captured between the pressure cylinder piston and the pressure cylinder floor to bias the pressure cylinder piston below the pressure cylinder intake port in the first position, and the pressure cylinder including a pressure cylinder opening directed into the support rod central conduit, and a valve plate including a spring hinge to bias the valve plate to overlie the pressure cylinder opening, wherein projection of the pressure cylinder piston through the pressure cylinder effects displacement of the valve plate to direct the pressurized pneumatic charge into the central conduit and into the pneumatic chamber through the support rod apertures.

4. An apparatus as set forth in claim 3 wherein the pressure cylinder piston includes a pressure cylinder plunger rod, wherein the pressure cylinder piston is fixedly mounted to an upper distal end of the pressure cylinder plunger rod, and the plunger rod is directed through the pressure cylinder spring, and the plunger projects through the pneumatic chamber terminating in a pressure cylinder plunger rod head exteriorly of the partition housing.

5. An apparatus as set forth in claim 4 including a screened intake port directed through the partition housing adjacent the pressure cylinder intake port.

6. An apparatus as set forth in claim 5 including a lower exhaust cylinder positioned within the partition housing spaced from the pressure cylinder, the lower exhaust cylinder coaxially aligned with an upper exhaust cylinder, wherein the lower exhaust cylinder is positioned below the support rod and the upper exhaust cylinder is positioned above the support rod, and the lower exhaust cylinder includes a lower exhaust cylinder rod directed through the partition housing and extending into the lower exhaust cylinder including a directional tube coaxially aligned with the support rod central conduit in a first position, and an upper exhaust cylinder spring mounted within the upper exhaust cylinder in communication with the directional tube, whereupon displacement of the directional tube to a second position displaced from coaxial alignment with the support rod central conduit permits the upper exhaust cylinder spring to bias the directional tube into the first position from the displaced second position.

7. An apparatus as set forth in claim 6 including at least one lower exhaust cylinder exit port directed through the lower exhaust cylinder, and an exhaust port directed through the partition housing in communication with the at least one exit port to permit exhausting of pneumatic pressure through the exit port and the exhaust port, and the lower exhaust cylinder rod including a lower exhaust cylinder rod head positioned exteriorly of the partition housing mounted to a lower distal end of the lower exhaust cylinder rod.

* * * * *